(12) United States Patent
Patil

(10) Patent No.: US 10,437,581 B1
(45) Date of Patent: Oct. 8, 2019

(54) INTERNET OF THINGS PLATFORM FOR HANDLING FIRMWARE TRANSFER ON MACHINE-TO-MACHINE DEVICES

(71) Applicant: AT&T Mobility II LLC, Atlanta, GA (US)

(72) Inventor: Basavaraj Patil, Dallas, TX (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 15/958,084

(22) Filed: Apr. 20, 2018

(51) Int. Cl.
| | |
|---|---|
| *G06F 9/44* | (2018.01) |
| *G06F 8/65* | (2018.01) |
| *G06F 8/71* | (2018.01) |
| *H04L 12/751* | (2013.01) |
| *H04L 29/08* | (2006.01) |
| *G06F 9/445* | (2018.01) |

(52) U.S. Cl.
CPC .............. *G06F 8/65* (2013.01); *G06F 8/71* (2013.01); *G06F 9/44505* (2013.01); *H04L 45/02* (2013.01); *H04L 67/34* (2013.01)

(58) Field of Classification Search
CPC ................................................. G06F 8/60–66
USPC ................................................. 717/168–178
See application file for complete search history.

(56) References Cited

U.S. PATENT DOCUMENTS

| | | | |
|---|---|---|---|
| 7,480,907 B1 | 1/2009 | Marolia et al. | |
| 8,010,965 B2 | 8/2011 | Keany et al. | |
| 8,612,582 B2 | 12/2013 | Dare et al. | |
| 8,677,343 B2 | 3/2014 | Averbuch et al. | |
| 9,128,796 B2 | 9/2015 | Chitre et al. | |
| 9,158,525 B1* | 10/2015 | Naganathan | G06F 8/65 |
| 9,158,526 B1* | 10/2015 | Nguyen | H04L 41/08 |
| 9,276,740 B2 | 3/2016 | Nix | |
| 9,590,961 B2 | 3/2017 | Sundaram et al. | |

(Continued)

FOREIGN PATENT DOCUMENTS

| | | |
|---|---|---|
| CN | 1584822 | 4/2010 |
| CN | 103902309 | 7/2014 |

(Continued)

OTHER PUBLICATIONS

Lu et al., "Enabling Smart Grid with ETSI M2M Standards," 2012 IEEE Wireless Communications and Networking Conference Workshops (WCNCW), Apr. 1, 2012 IEEE 2012.

(Continued)

*Primary Examiner* — Jue Louie
(74) *Attorney, Agent, or Firm* — Hartman & Citrin LLC

(57) ABSTRACT

Concepts and technologies of handling firmware for machine to machine devices via a service provider network are provided herein. In an embodiment, a computer system can provide an Internet of Things platform. The computer system may include a processor configured to intercept, via a service provider network, an activity message sent from a machine-to-machine device. The processor can obtain a firmware version identifier and an equipment identifier from the activity message. The processor can determine that a firmware update package is available for the machine-to-machine device, and in response, generate a schedule command that instructs a firmware scheduler to send a firmware update request to a firmware-over-the-air server. The processor can provide the schedule command to the firmware scheduler on behalf of the machine-to-machine device.

20 Claims, 5 Drawing Sheets

(56) References Cited

U.S. PATENT DOCUMENTS

| | | | |
|---|---|---|---|
| 9,596,078 B2 | 3/2017 | Nix | |
| 9,836,296 B2 | 12/2017 | Vandikas et al. | |
| 9,847,018 B2 | 12/2017 | e Silva et al. | |
| 2005/0124332 A1 | 6/2005 | Clark et al. | |
| 2006/0195555 A1* | 8/2006 | Karnatz | G06F 8/65 709/220 |
| 2008/0052698 A1* | 2/2008 | Olson | G06F 9/44589 717/168 |
| 2011/0231834 A1 | 9/2011 | Kim | |
| 2012/0005276 A1* | 1/2012 | Guo | H04L 67/34 709/206 |
| 2012/0124570 A1* | 5/2012 | Alberth, Jr. | G06F 8/65 717/173 |
| 2013/0074061 A1* | 3/2013 | Averbuch | G06F 8/665 717/171 |
| 2013/0346959 A1* | 12/2013 | Tanaka | G06F 8/65 717/170 |
| 2014/0115574 A1* | 4/2014 | Valentine | H04L 67/34 717/172 |
| 2014/0304700 A1* | 10/2014 | Kim | G06F 8/65 717/173 |
| 2015/0007157 A1 | 1/2015 | Park et al. | |
| 2015/0193223 A1 | 7/2015 | Cardamore | |
| 2016/0196131 A1 | 7/2016 | Searle et al. | |
| 2016/0196132 A1 | 7/2016 | Searle et al. | |
| 2017/0060567 A1 | 3/2017 | Kim et al. | |
| 2017/0141968 A1* | 5/2017 | Lloyd | H04L 41/22 |
| 2017/0215026 A1 | 7/2017 | Kim et al. | |
| 2017/0351503 A1* | 12/2017 | Storto | G06F 8/61 |
| 2017/0359419 A1 | 12/2017 | Mungo et al. | |
| 2017/0364349 A1* | 12/2017 | Conant | H04W 4/80 |
| 2018/0275982 A1* | 9/2018 | Hunt | H04L 67/34 |

FOREIGN PATENT DOCUMENTS

| | | |
|---|---|---|
| CN | 104184814 | 12/2014 |
| KR | 20070038810 | 4/2007 |
| KR | 20170108279 | 9/2017 |
| WO | WO 2011/137793 | 11/2011 |
| WO | WO 2016/022017 | 2/2016 |

OTHER PUBLICATIONS

Ruckebusch et al., "GITAR: Generic extension for Internet-of-Things ARchitectures enabling dynamic updates of network and application modules," Ad Hoc Networks 36, Jun. 1, 2015.

"What is Mender?" Mender 2017, retrieved at https://web.archive.org/web/20171219121945/https://mender.io/what-is-mender on Jan. 16, 2018.

"Gartner Identifies the Top 10 Internet of Things Technologies for 2017 and 2018," Gartner, gartner.com, Feb. 23, 2016.

Ordman, Roger, "Efficient over-the-air software and firmware updates for the Internet of Things," Embedded Computing Design, embeddedcomputing.com, Apr. 1, 2014.

* cited by examiner

INTERNET OF THINGS PLATFORM FOR HANDLING FIRMWARE TRANSFER ON MACHINE-TO-MACHINE DEVICES

BACKGROUND

As various machines become connected to networks, control of the functions and operations of the machines can occur remotely, such as via input from people using a mobile communications device or other user equipment connected to a communications network. Conventionally, home networks included a single home computing device that connected to the internet through a hardwire connection. As time progressed, wireless network access became commonplace as the home computing device became more portable, such as through the use of a laptop while a user sits on their couch. Advances in computing and related technologies have led to increased sophistication in application of technologies to consumer electronic devices. Specifically, consumer electronic devices have increasingly acquired the capability of being connected to the home network and performing tasks such as, turning on the lights in a user's home, regulating the washing machine, remote power activation of an appliance, display of digital photographs, or other functions that can receive, store, and activate digital media. These devices can be considered to fall within a category referred to as machine-to-machine devices that are able to communicate with other devices and receive remote commands for functionality. These machine-to-machine devices can be manufactured by a variety of companies. In some instances, the machine-to-machine devices may not be cognizant or privy to other communications or congestion occurring on the home and/or service provider network.

The growth in the number of machine-to-machine devices can provide benefits to the user's life; however, this same growth can increase the network traffic within the home network. There has also been a rise in the concern with the amount of energy various devices consume while operating on the home or service provider network. Traditional mechanisms for regulating power consumption include initiation of a shutdown procedure for personal computers, thereby placing the device completely offline. However, complete shutdown can reduce the ability of a device to connect with the network. Thus, conventional mechanisms for reducing energy consumption for the machine-to-machine devices can include a standby mode or hibernation mode when the device is not frequently used. Therefore, a machine-to-machine device that is in a state of non-continuous network connection may not be available to a remote user at all times and/or may require more time to activate when automated functions are initiated.

SUMMARY

The present disclosure is directed to an internet of things platform for handling firmware on machine-to-machine devices. According to one aspect of the concepts and technologies disclosed herein, a system for handling firmware on machine-to-machine devices is disclosed. The system can include a processor and a memory. The memory can store computer-executable instructions that, when executed by the processor, cause the processor to perform operations. In some embodiments, the operations can include intercepting an activity message sent from a machine-to-machine device. In some embodiments, the activity message can include state information that does not request a firmware update. In some embodiments, intercepting can occur via a service provider network. The operations also can include obtaining a firmware version identifier and an equipment identifier from the activity message. The operations can also include generating a schedule command that instructs a firmware scheduler to send a firmware update request to a firmware-over-the-air server. In some embodiments, generating the schedule command can be in response to determining that a firmware update package is available for the machine-to-machine device. The operations also can include providing the schedule command to the firmware scheduler on behalf of the machine-to-machine device.

In some embodiments, the operations also can include accessing a registry based on the equipment identifier of the machine-to-machine device. The operations can include appending the registry to include the firmware version identifier, where the firmware version identifier can correspond to a firmware package that is resident on the machine-to-machine device which sent the activity message. In some embodiments, the operations can further include determining whether the machine-to-machine device operates using a depletable power source or fixed power source. In some embodiments, the depletable power source can include a rechargeable battery. In response to determining that the machine-to-machine device operates using the depletable power source, the operations can further include creating a delay command that instructs the firmware scheduler to send the firmware update request on behalf of the machine-to-machine device. In some embodiments, the delay command can instruct the firmware scheduler to send the firmware update request when the machine-to-machine device's depletable power source is being charged.

In some embodiments, the operations can further include building a usage profile that indicates a usage time and a usage frequency by the machine-to-machine device. The usage profile can be associated with an equipment identifier of the machine-to-machine device. The operations also can include generating a usage threshold that provides a minimum usage frequency. The operations can also include determining whether the machine-to-machine device exceeds the usage threshold. In some embodiments, generating the schedule command can be in response to determining that the machine-to-machine device exceeds the usage threshold. In some embodiments, the operations can further include determining that the machine-to-machine device does not exceed the usage threshold. If the machine-to-machine device does not exceed the usage threshold, the operations can also include instructing the firmware scheduler to withhold scheduling a firmware update for the machine-to-machine device until the usage threshold is exceeded.

In some embodiments, the operations can further include determining a route path identifier. In some embodiments, the route path identifier is stored within the usage profile. The route path identifier can indicate a network communication path type that should be used to route the firmware update package to the machine-to-machine device. In some embodiments, the network communication path type can correspond with at least one of a wireless communication path or a wired communication path. In some embodiments, the operations can further include providing the route path identifier and the schedule command to the firmware scheduler.

It should be appreciated that the above-described subject matter may be implemented as a computer-controlled apparatus, a method as a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
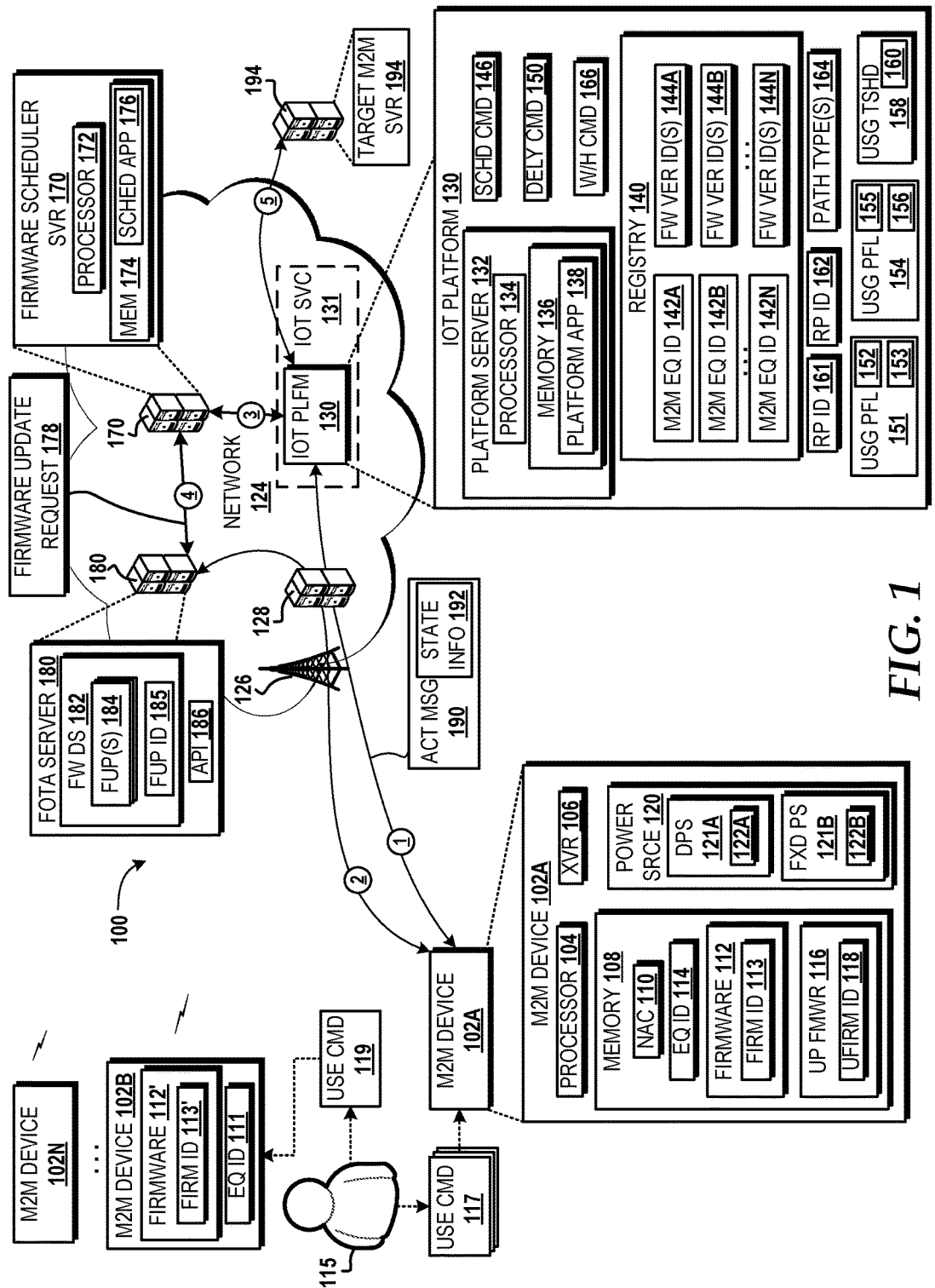
FIG. 1 is a system diagram illustrating an operating environment for handling firmware for machine-to-machine devices for various embodiments of the concepts and technologies described herein.

The following detailed description is directed to handling firmware for machine-to-machine (M2M) devices through an Internet of Things (IoT) platform. As the use of machine-to-machine devices, also referred to as IoT devices, becomes more prevalent, users may purchase and/or otherwise obtain their M2M devices through various retailers. In some instances, M2M devices are designed, sourced, and manufactured under the control of a single corporation and/or entity. However, this may not always be the case. In some instances, the design and sourcing of hardware and/or software incorporated within the M2M device may be provided by multiple corporations, engineering groups, manufacturers, or the like. In some embodiments, the original equipment manufacturer of a certain M2M device may expose an application programming interface of the M2M device so that other devices and/or IoT services can connect and/or control the M2M device as part of a home network. However, a communication service provider may not be privy to the amount of M2M devices that a user has in their home network. Additionally, because some M2M devices are not associated with a single point of contact for the manufacturer or user, the communication service provider may be unsure of the software, firmware, and/or hardware versions currently residing on the M2M device. In some instances, a communication service provider may not have physical access to the M2M devices and/or permission to remotely tune the tasks performed on the M2M device (e.g., may not have permission to remotely turn on or off the M2M device). Moreover, communication service providers may not be privy to the firmware development cycle of manufacturers of the M2M devices, thereby making the communication service provider dependent on public announcements as to when firmware will be updated for the M2M device. When an update is released, conventional routines programmed within the M2M devices can flood the network of the communication service provider with requests to update, upgrade, or otherwise reconfigure the M2M device based on the announcement from the manufacturer. This can cause network congestion and bottlenecks for handling requests, thereby potentially burdening the memory and processing resources of the network belonging to the communications service provider.

Therefore, embodiments of the present disclosure are directed to the handling of firmware updates and/or upgrades for M2M devices through the use of an IoT platform associated with a communication service provider network. For example, an M2M device may include an instance of firmware that was originally installed at the time of manufacture. In some instances, the M2M device may have a user interface that allows the user to interact and control the functionality of the device, but not allow the user to request a system update, such as for an updated firmware package. However, the M2M device can provide information, such as a firmware version identifier and an equipment identifier, within activity messages that are sent to the network from the M2M device. The activity messages may not request firmware updates, but rather can be sent to and/or from the device during normal operations, such as when sending status reports and/or when communicating with a user. To mitigate network congestion and a potential storm of communication requests for updates from M2M devices at approximately the same time, embodiments of the present disclosure include an IoT platform that can intercept an activity message sent from an M2M device before such requests for updates occur. The IoT platform can obtain a firmware version and an equipment version from the activity messages sent from each M2M device. The IoT platform can access a registry that collects information on a plurality of M2M devices that have used the network to connect and transmit messages. The IoT platform may not be associated with a manufacturer or developer of the M2M device, and therefore the M2M device would not necessarily target the IoT platform as a destination for receiving update requests. The IoT platform can determine the type of power source that the M2M uses to connect and communicate with the network, such as via use of a depletable power source (e.g., a rechargeable battery) or a fixed power source (e.g., a power unit with continuous charge from a wall outlet). The IoT platform can determine how often the M2M device is used and when the last time the M2M device received a firmware update. The IoT platform can communicate with a firmware scheduler computer system to determine whether a firmware update is available from the manufacture or developer.

In some instances, when an update is available, the IoT platform can generate a schedule command on behalf of the M2M device. The schedule command can be based on the past, present, and/or projected network conditions, such as network congestion, availability of network channels, processing resources, or the like. The IoT platform can send the schedule command to the firmware scheduler, which in turn can communicate with a firmware-over-the-air server that can provide the firmware update to the M2M device. In some embodiments, the IoT platform can identify a preferred route to deliver the firmware update, such as via wireless communications and/or an optical network. In some embodiments, the IoT platform can determine that features of the M2M device are not used frequently, which may be determined by a lack of use commands from a user. For example, the M2M device may be configured as a smart lightbulb in the house of a user. Although the user may frequently use their smart thermostat and home voice assistant, the smart lightbulb may be located in an area that is not visited, and thus the light does not turn on frequently. Moreover, even if the M2M device itself is used, the user does not remotely command the M2M device to perform functions, thereby indicating to the IoT platform that the M2M device falls below a usage threshold. In this case, the IoT platform may withhold, block, and/or delay the firmware update from reaching the M2M device until certain conditions are met, such as the M2M device exceeding the usage threshold and/or the M2M device explicitly sending a request to update the firmware. However, if the M2M device exceeds the usage threshold, the IoT platform can coordinate with the firmware scheduler to request that a firmware update be provided to the M2M device. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, an illustrative operating environment 100 in which the various concept and technologies disclosed herein can be implemented will be described. The illustrated operating environment 100 includes a plurality of M2M devices 102A-102N (referred to herein collectively as M2M devices 102) operating in communication with a service provider network ("network") 124 by way of one or more access points, such as an access point 126. Although only a single access point 126 is shown, the network 124 can support multiple access points configured the same as or similar to the access point 126.

Each of the M2M devices 102 can communicatively couple, directly and/or indirectly, with the network 124 via wired and/or wireless communications. In some embodiments, the communicative coupling of the M2M devices 102 with the network 124 can form, at least in part, an IoT network that can be accessed as a communication service offered by a communication service provider associated with the network 124. It should be understood that, as used herein, the term "service", and variations thereof, refers to network hosted operations and machine executed functions that can allow one or more of the M2M devices 102 to interact with the network 124, each other, and/or other network devices. It should also be understood that the term "IoT" refers to a computing architecture by which physical objects, collectively "things", are specifically configured to be network addressable (e.g., the M2M devices 102) so as to facilitate interconnectivity for the exchange of data and remote access. The M2M devices 102 can be or can include any "thing" that can collect data and that is configured to be network addressable so as to connect to, and communicate with, one or more networks, such as the network 124, over which to communicate data to other connected devices, such as but not limited to, computers, smartphones, tablets, vehicles, virtual reality devices, other M2M devices, combinations thereof, and the like.

The M2M devices 102 can be deployed across various industry segments and embedded in a variety of locations, such as basements in multi-dwelling units, underground tunnels, manhole covers, roadways, subway systems, a user's dwelling, a place of employment, a traffic intersection, water and air conditioning systems, lighting devices, vehicles, and/or the like, where there could be (non)emergency situations that need to relay communications to protect safety, increase efficiency, or otherwise alter behavior of humans, machines, and interactions thereof. The M2M devices 102 can be deployed for consumer use and/or business use, and can find application in many industry-specific use cases. For example, the M2M devices 102 may find at least partial application in the following industries: automotive, energy, healthcare, industrial, retail, and smart buildings/homes. Those skilled in the art will appreciate the applicability of M2M solutions in other industries as well as consumer and business use cases. For this reason, the applications of the M2M devices 102 described herein are used merely to illustrate some examples and therefore should not be construed as being limiting in any way. Although in the illustrated example the M2M devices 102 are shown as being in communication with one network (i.e., the network 124), the M2M devices 102 may be in communication with any number of networks, including networks that incorporate different communication technologies (e.g., WI-FI, LTE, LTE-Advanced, 5G, and/or New Radio standards), and as such, one or more of the M2M devices 102 can be multi-mode devices.

In some embodiments, the M2M devices 102 can receive usage commands from a user, such as the user 115 providing the usage commands 117, 119 to the M2M device 102A, 102B, respectively. For example, the user 115 may have purchased the M2M device 102A and the M2M device 102B for use in a home or work setting. The user 115 provides input by way of the usage commands 117, 119 so as to interact with the M2M devices 102A, 102B. It is understood that user input, such as the usage commands 117, 119, can be provided directly and/or indirectly to any of the M2M devices 102, such as via a user interface (not shown) and/or via the network 124. The usage commands 117, 119 can provide an instruction, a value, a modification, or the like to the M2M device so as to affect when and/or how a particular one of the M2M devices 102 functions. For example, the user 115 can provide the usage command 117 to the M2M device 102A in order to instruct the M2M device 102A to turn on, turn off, alter a schedule and/or setting, provide readouts of information collected and/or determined by the M2M device 102A, and/or perform any other function capable by the M2M device 102. In an embodiment where the M2M devices 102A, 102B are smart lightbulbs, the usage commands 117, 119 could correspond with an instruction to turn on and/or off a lighting element of the device. In some embodiments, the usage commands 117, 119 are not intentionally provided by the user 115 (or object such as a vehicle or machine) to the M2M devices 102, but rather the M2M devices 102 can sense and/or detect an action, movement, and/or other trigger within the operating environment 100, thereby causing one or more of the M2M devices 102 to generate a usage command, such as the usage commands 117, 119. It is understood that the examples provided as to the specific forms of the M2M devices 102 are for illustration purposes only, and therefore are should not be construed as being limiting in any way.

Although shown as being provided directly to the M2M devices 102A, 102B, it is understood that, in some embodiments, the usage commands 117, 119 can be provided via a user device (e.g., a smartphone) associated with the user 115 such that input is accomplished via local communicative coupling and/or via the network 124. In some embodiments, one or more of the M2M devices 102 do not receive the same amount of use. For example, the M2M device 102A can operate at a location within the operating environment 100 where the user often frequents (e.g., a workplace corridor and/or a home hallway), while the M2M device 102B is designated to operate at another location that is not frequented by the user 115, or any other users, as often as the M2M device 102A. Put simply, in some embodiments, the M2M device 102A may be used more frequently than the M2M device 102B, and therefore the M2M device 102A may function and/or communicate with the network 124 more often than the amount that the M2M device 102B functions and/or communicates with the network 124.

For clarity, a description of the M2M device 102A is provided. However, it is understood that the M2M devices 102B-102N can be configured substantially similar to that of the M2M device 102A. In some embodiments, the M2M device 102A can include a processor 104 that provides virtual and/or physical compute resources, a transceiver 106 that provides wired and/or wireless communication functions, and a memory 108 that provides temporary and/or permanent storage operations. In some embodiments, the M2M device 102A can include a display (not shown) that can present a user interface. In some embodiments, user interaction can occur via mechanical input. The M2M device 102A can also include one or more power sources, such as the power source 120.

The power source 120 can provide, at least in part, an electrical charge that can be used by the processor 104 and other components of the M2M device 102A to perform operations discussed herein. In some embodiments, the power source 120 can include one or more instances of a depletable power source 121A and/or a fixed power source 121B. For example, the depletable power source 121A can include a rechargeable and/or non-rechargeable battery unit. One of ordinary skill would be familiar with the various types of depletable power sources (e.g., lithium ion batteries, nickel metal hydride batteries, lead batteries, etc.) and therefore would recognize embodiments thereof. The depletable power source 121A can be associated with a depletable power source identifier 122A. In some embodiments, the depletable power source identifier 122A can be stored in the memory 108. The depletable power source identifier 122A can identify and otherwise indicate the presence of the depletable power source 121A on the M2M device 102A, the maximum charge capacity (e.g., measured in milliamp hours), current charge levels (e.g., measured in milliamp hours), the amount of charge cycles (to full or partial charge capacity) over the lifetime of the M2M device 102A, a voltage supply amount, a current supply amount, an indication of whether the depletable power source 121A is in the process of being charged, a combination thereof, or other information that indicates the state, operation, and/or performance of the depletable power source 121A. The fixed power source 121B can include a power supply and/or other power unit by which the M2M device 102A is provided with a constant, consistent, or otherwise usable amount of energy from an internal and/or external source. For example, the fixed power source 121B can include an electric power converter that receives an electric current from an external energy generation source (e.g., an electrical outlet in the wall of a building, a generator, a wireless energy radiation source, etc.) and converts the received electric current to the correct voltage, current, and/or frequency to power the particular load within the M2M device 102A (e.g., the processor 104, the transceiver 106, the memory 108, etc.). In some embodiments, the fixed power source 121B can correspond with a fixed power source identifier 122B. The fixed power source identifier 122B can identify and otherwise indicate the presence of the fixed power source 121B on the M2M device 102A, a voltage supply amount, a current supply amount, an indication of the age of the fixed power source 121B, a combination thereof, or other information that indicates the state, operation, and/or performance of the fixed power source 121B.

In some embodiments, the memory 108 and/or other hardware of the M2M 102A can store an equipment identifier 114 that can indicate an identification of one or more aspects of the M2M 102A. For example, in some embodiments, the equipment identifier 114 can include, but should not be limited to, a mobile equipment identifier (MEI), an international mobile equipment identity (IMEI), a mobile station international subscriber directory number (MSISDN), a Type Allocation Code (TAC), an electronic serial number, original equipment manufacturer identity, a combination thereof, or the like. The equipment identifier 114, in some embodiments, can include a device category that specifies a category to which the M2M device belongs. The equipment identifier 114 can include information that identifies the M2M device 102A as being a device for a standard telecommunication service such as voice and/or data, an IoT device, a combination thereof, or the like. In some embodiments, the M2M device 102A can be a category 1 ("CAT1"), CAT0, CATM based machine-type communication device, a future machine-type communication standard, or some combination thereof.

The M2M devices 102 can also include firmware embedded within circuitry of each device. For example, in some embodiments, the M2M device 102A can include firmware 112 that can be executed and operated in conjunction with an operating system to control hardware and facilitate operations of the M2M device 102A. In some embodiments, the firmware 112 can be referred to as a firmware package. In some instances, the firmware 112 can be overwritten, altered, reinstalled, modified, and/or updated, which is represented in FIG. 1 as updated firmware 116. The firmware 112 can correspond with a firmware identifier 113 that can include an identification, a developer number, and/or another unique firmware identity that provides an indication as to a what version of firmware is installed on the M2M device 102A. Similarly, in some embodiments, the updated firmware 116 can include an updated firmware identifier 118 associated with the updated firmware 116. In some embodiments, the updated firmware 116 may be referred to as a change to the firmware 112, a modified firmware, and/or an altered firmware. In some embodiments, instances of firmware (e.g., any of the firmware 112 and/or the updated firmware 116) can include a file, a package, and/or segment of executable instructions that is loaded into at least a portion of the memory 108 available on the M2M 102A, such as but not limited to flash memory. In some instances, the firmware 112 can be stored in a read-only portion of the memory 108 and/or a read-write portion of the memory 108. The updated firmware 116 is intended to refer to a full and/or partial instance of a firmware package that is stored on the M2M device 102A as a replacement of, and/or supplement to, the firmware 112. When the M2M has the firmware 112 loaded thereon, the firmware identifier 113 may be made available for retrieval. In some embodiments, when the updated firmware 116 is loaded onto the M2M device 102A, the updated firmware identifier 118 is made available for retrieval. In some embodiments, once the updated firmware 116 is installed on the M2M device 102A, the firmware identifier 113 may no longer be available for retrieval due to the firmware 112 being replaced with the updated firmware 116. In some embodiments, the firmware identifier 113 may remain available for retrieval in the memory 108 (irrespective of whether the firmware 112 has been deleted, overwritten, replaced, modified, and/or supplemented with the updated firmware 116) in order to provide a firmware history for the M2M device 102A. It is understood that the examples provided are for illustration purposes only, and therefore should not be construed as limiting the scope of the disclosure in any way.

In some embodiments, the memory 108 of the M2M device 102A can include a network access controller 110. The network access controller 110 can be an application, a script, an executable module, a combination thereof, or the like, that can receive inputs (e.g., the usage command 117) and translate the inputs into messages and/or requests that can be sent to the network 124. The network access controller 110 can manage the transmission and receipt of any incoming and/or outgoing communications via the transceiver 106. The M2M device 102A may be manufactured, developed, and/or otherwise associated with a producer of the M2M device 102A by which the M2M device 102A can be accessed remotely and be in communication with a central server that interacts with other M2M devices from that producer. For example, the M2M device 102A may have been developed by a company that manages and operates a target M2M server 194 that can be accessed via one or more networks. In some embodiments, the target M2M server 194 can be hosted by a network that is separate from the network 124. The target M2M server 194 can be communicatively coupled to the network 124 via the communication path 5, which can provide wired and/or wireless communications. The target M2M server 194 can act as the destination, or target, of messages sent by the M2M device 102A. For example, when the M2M device 102A boots up, wakes up, and/or otherwise is in active use, the network access controller 110 can send an activity message 190 that is addressed to the target M2M server 194. The activity message 190 may be sent via a wired and/or wireless transmission (e.g., along the communication path 1 and/or any other path) via the network 124, for delivery to the target M2M server 194. In some embodiments, the target M2M server 194 can act upon information included in the activity message 190 and/or store information included in the activity message 190 for later retrieval, diagnostics, analytics, or the like. The target M2M server 194 may or may not be associated with a communication service provider of the network 124. It is understood that the examples discussed are for illustration purposes only, and therefore should not be construed as limiting in any way.

The activity message can be created by the network access controller 110. In some embodiments, the activity message 190 is not used for update requests, and thus does not include a request to initiate and/or otherwise schedule an update of software and/or firmware that resides on the M2M device 102A. In some embodiments, the M2M device 102A is configured to receive updates for software and/or firmware without making a request, and thus does not make specific requests for such software and/or firmware updates. As such, the activity message 190 is not sent by the M2M device 102A in order to identify whether new software and/or firmware is available for update on the M2M device 102, irrespective of the party who could and/or would provide such updates. The activity message 190 can include the equipment identifier 114 corresponding to the M2M device 102A. In some embodiments, the activity message 190 can include information pertaining to the state of operations of the M2M device 102A, such as represented by state information 192. For example, in some embodiments, the state information 192 of the activity message 190 can include information about the currently and/or previously installed firmware on the M2M device 102A, such as via incorporation of the firmware identifier 113 and/or any previously installed firmware. In some embodiments, the state information 192 can include one or more of the depletable power source identifier 122A and/or the fixed power source identifier 122B. In some embodiments, the state information 192 can be included in a header of the activity message 190. The M2M devices 102 can be configured to send communications to the network 124 via wired and/or wireless communication paths, such as any of the communication path 1 and the communication path 2. It is understood that the examples discussed are for illustration purposes only, and therefore should not be construed as limiting in any way.

The network 124 can be supported by one or more compute resources, memory resources, and/or other resources. For example, the compute resource(s) can include one or more particular hardware devices that perform computations to process data, and/or to execute computer-executable instructions of one or more application programs, operating systems, and/or other software, including applications that provide, at least in part, an IoT monitoring service 131 and/or an IoT platform 130. The compute resources can include one or more central processing units ("CPUs") configured with one or more processing cores, and/or one or more graphics processing unit ("GPU") configured to accelerate operations performed by one or more CPUs. The compute resources can include one or more system-on-chip ("SoC") components along with one or more other components, including, for example, one or more of the memory resources, and/or one or more of the other resources. The memory resource(s) can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources. The other resource(s) can include one or more hardware and/or virtual resources, one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like. In some embodiments, the compute resources, the memory resources, and/or the other resources can collectively function to enable network traffic across the network 124 so as to support communication services for user equipment. Additional details of aspects of the network 124 are illustrated and described below with reference to FIG. 3.

In some embodiments, the network 124 can include one or more of a radio access network, an evolved packet core network, a core network, an IP-based network, a circuit switched network, a mobile a Wide Area Network, and/or a combination thereof. In some embodiments, at least a portion of the network 124 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, new radio access technology (e.g., LTE-Advanced and other 5G technology), Worldwide Interoperability for Microwave Access ("WiMAX"), other current 3GPP cellular technologies, other future 3GPP cellular technologies, combinations thereof, and/or the like. The network 124 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), Licensed Assisted Access ("LAA") as part of LTE Advanced Pro, and the like to provide a radio/air interface to the M2M devices 102. Those skilled in the art will appreciate the applicability of the concepts and technologies disclosed herein to other cellular technologies, including, in particular, those captured within future generation 3GPP standards.

The network 124 can include one or more access point, such as the access point 126, that can facilitate communicative coupling between the network 124 and any of the M2M devices 102. The access point 126 can provide wired and/or wireless communicative coupling and can include a base transceiver station, a wireless router, a femtocell, an eNode B, a NodeB, a gNode B (i.e., an access point that incorporate new radio access technology, such as LTE-Advanced and other 5G technology), a multi-standard metro cell node and/or other network nodes or combinations thereof that are capable of providing communication to and/or from the network 124. As illustrated in FIG. 1, the communication path 1 and the communication path 2 are shown as traversing through the access point 126, however this may not be the case in all embodiments. In some embodiments, the access point 126 can provide the communication path 2 to allow wireless communicative coupling with the M2M devices 102, while another access point (not shown) can provide the communication path 1 to allow the M2M devices 102 to communicatively couple, at least in part, via a wired transport line, such as a fiber optic path. In some embodiments, more than one access point is implemented to facilitate the communication path 1 and/or the communication path 2. Although one instance of the access point 126 is illustrated in FIG. 1, it is understood that multiple instances of the access point 126 can be included in various embodiments. Therefore, the examples provided are for illustration purposes only, and should not be construed as limiting in any way.

In some embodiments, the network 124 can include one or more packet data network gateway ("PGW") 128. The PGW 128 can be configured in accordance with 3GPP standards specifications. In some embodiments, the PGW 128 can interconnect the M2M devices 102 to one or more other networks, such as, for example, one or more other public land mobile networks ("PLMNs"), one or more packet data networks ("PDNs") such as, for example, the Internet, one or more circuit-switched networks, combinations thereof, and/or the like. The PGW 128 can route IP packets, messages (e.g., the activity message 190), and other network transmissions to and from the access point 126, components within the network 124, and components outside the network 124 (e.g., the target M2M server 194). In some embodiments, the PGW 128 can be configured to identify a target destination and/or a next hop in order to provide communicative coupling to and/or from the M2M devices 102. The PGW 128 can perform operations such as IP address/prefix allocation, policy control, and/or charging. In some embodiments, the PGW 128 can determine that the activity message 190 is destined for the target M2M server 194, and in response, route the activity message 190 through the IoT platform 130 irrespective of whether the M2M device 102A has subscribed to the IoT monitoring service 131. In some embodiments, the PGW 128 can be configured to offer functionality of a service gateway that routes incoming and outgoing IP packets between a radio access network and an evolved packet core on behalf of the M2M devices 102. The PGW 128 can be configured in accordance with 3GPP standards specifications.

In some embodiments, the communication service provider associated with the network 124 may offer customers (e.g., the user 115) the opportunity to sign-up for and/or freely engage in an IoT monitoring service, such as the IoT monitoring service 131. In some instances, the IoT monitoring service 131 can interact with a variety of M2M devices (e.g., the M2M devices 102) that use the network 124 to communicate with other devices within the network 124 and/or with other networks, irrespective of whether the users associated with the M2M devices 102 have agreed to and/or intentionally signed-up for the IoT monitoring service 131. In some instances, the IoT monitoring service 131 is a back-end communication service that is not visible to the customers and/or client devices (e.g., the user 115 and/or the M2M devices 102). As such, the IoT monitoring service 131 may facilitate operations of the communication service provider associated with management of the network 124. In some embodiments, the IoT monitoring service 131 can include an IoT platform, such as the IoT platform 130. In some embodiments, the IoT platform 130 can be integrated with servers and network equipment, and therefore may not be considered to operate as part of the IoT monitoring service 131. The IoT platform can provide a scalable, rapid solution development platform that is made of up of tightly integrated virtual and physical network components that allow for monitoring and management of connected devices, such as the M2M devices 102. It is understood that the examples provided are for illustration purposes only, and therefore should not be construed as limiting in any way.

In some embodiments, the IoT platform 130 can include one or more instances of a platform server 132. The platform server 132 can include a processor 134 and a memory 136 that stores a platform application 138. The processor 134 can include a central processing unit, a graphics processing unit, a system-on-chip circuit, a combination thereof, and/or other compute resources that can be configured upon execution to perform operations discussed herein. The memory 136 can provide temporary and/or permanent storage operations, and can include volatile and/or non-volatile memory that can be implemented in any method or technology for storage of information such as computer-readable instructions, data structures, program modules, or other data disclosed herein. The memory 136 can include computer storage media such as, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the processor 134. The platform application 138 can include computer-readable instructions, data structures, program modules, and/or other data that can configure the platform server 132 to perform operations upon execution. One or more instances of the platform application 138 can reside within the network 124 and function to interact with one or more of M2M devices 102, the target M2M server 194, a firmware scheduler server 170, a firmware-over-the-air ("FOTA") server 180, and/or other network components. It is understood that the platform server 132 can be provided by one or more physical and/or virtual resources across the network 124. As such, the platform application 138 can monitor and manage a plurality of communications by scaling the usage of physical and/or virtual compute resources and memory resources, as needed.

In some embodiments, the platform application 138 can provide broker functionality by analyzing incoming and outgoing messages to determine an identity of a corresponding M2M device. The platform application 138 can be configured to provide unique data handling so as to perform specific actions based on the particular M2M device that is associated with the message being sent. For example, the PGW 128 can route the activity message 190 through the IoT platform 130 based on the activity message 190 being destined for the target M2M server 194. The platform application 138 can intercept the activity message 190 that originated from the M2M device 102A. For example, prior to allowing the activity message 190 to be routed to the target M2M server 194, the activity message 190 and/or a copy thereof, can be analyzed to determine whether any specific actions should be taken on behalf of the M2M device 102A. The platform application 138 can obtain the state information 192 of the M2M device 102A from the activity message 190, such as the firmware identifier 113 and/or the equipment identifier 114. In some embodiments, the platform application 138 can identify the most recent firmware available for the M2M device 102A by referring to a registry 140 that is stored by the IoT platform 130.

In some embodiments, the registry 140 can be stored in a computer storage medium of the IoT platform 130 that is accessible to the platform application 138. In some embodiments, the registry 140 can be stored in the memory 136, although this may not be the case in every embodiment. The registry 140 can store, organize, and retain information about a plurality of real and/or virtual devices, including but not limited to each of the M2M devices 102. The registry 140 can include information about current and prior states of one or more of the M2M devices 102. The registry 140 can include an entry and/or account corresponding to each of the M2M devices 102. For example, in some embodiments, each of the M2M devices 102 can correspond with one of a plurality of M2M equipment identifiers 142A-142N. In an embodiment, the equipment identifier 114 of the M2M device 102A can correspond with the M2M equipment identifier 142A. Similarly, in an embodiment, an equipment identifier 111 of the M2M device 102B can correspond with the M2M equipment identifier 142B. Within the registry 140, each of the M2M equipment identifiers 142A-142N can be associated with a set of one or more firmware version identifiers 144A-144N. For example, the M2M equipment identifier 142A can correspond with the set of firmware version identifiers 144A. The set of firmware version identifiers 144A can indicate a current state and previous state of the firmware that is residing, and has previously resided, on the M2M device 102A. Similarly, the set of firmware version identifiers 144B can indicate a current state and previous state of the firmware that is residing, and has previously resided, on the M2M device 102B. Based on the equipment identifier 114 matching the M2M equipment identifier 142A, the platform application 138 can update the registry 140 with the current state of the firmware 112 by appending the firmware identifier 113 to the set of firmware version identifiers 144A corresponding to the M2M equipment identifier 142A. The platform application 138 can perform similar functions based on any activity messages sent from any of the M2M devices 102.

In some embodiments, the platform application 138 can receive an identification of a firmware version that updates and/or otherwise can replace a previous firmware version. For example, in some embodiments, the FOTA server 180 can send a firmware update package identifier 185 to the platform application 138 of the IoT platform 130. In some embodiments, the firmware update package identifier 185 can be relayed to the platform application 138 through the firmware scheduler server 170. Further discussion of the FOTA server 180 and the firmware scheduler server 170 is provided below. The firmware update package identifier 185 can indicate that a firmware update package 184 is available for installation, where the firmware update package 184 is configured to replace a previous firmware package, such as the firmware 112 installed on the M2M device 102A. Thus, in some embodiments, the platform application 138 can append the firmware update package identifier 185 to any of the sets of firmware version identifiers 144A-144N that identifies the firmware 112 by the firmware identifier 113. For example, the firmware 112 can be installed on the M2M device 102A and the firmware 112' (which is a copy of and/or another instance of the firmware 112) is installed on the M2M device 102B. In some embodiments, when the firmware 112 is installed on the M2M device 102A and should be updated, the platform application 138 can append the firmware update package identifier 185 to the set of firmware version identifiers 144A in the registry 140 so as to indicate that the firmware update package 184 is available for the M2M device 102A. By this, the platform application 138 can use the registry 140 to determine whether an update to the firmware 112 is available for download and installation to the M2M device 102A. Thus, if the firmware update package identifier 185 is present in the registry 140, but the set of firmware version identifiers 144A indicates that the M2M device 102A is using an outdated firmware version, then the platform application 138 can decide whether further action is warranted. In some embodiments, the platform application 138 can request that an update of the firmware 112 should be scheduled for the M2M device 102A in response to determining that the firmware update package 184 is available for the M2M device 102A. For example, in some embodiments, the platform application 138 can generate a schedule command 146 that instructs the firmware scheduler server 170 to send a firmware update request 178 to the FOTA server 180, where the firmware update request 178 instructs the FOTA server 180 to push the firmware update package 184 to the M2M device 102A. In other embodiments, in response to determining that the firmware update package 184 is available for the M2M device 102A, the platform application 138 can perform additional analysis before deciding that the schedule command 146 should be sent to the firmware scheduler server 170.

In some embodiments, the platform application 138 can determine whether the M2M device 102A operates using a depletable power source or a fixed power source. For example, the state information 192 of the activity message 190 can include the depletable power source identifier 122A and/or the fixed power source identifier 122B. If the state information 192 includes the depletable power source identifier 122A, then the platform application 138 can determine that the power source 120 of the M2M device 102A operates using the depletable power source 121A. In some embodiments, the depletable power source identifier 122A can indicate a current charge amount and/or whether the M2M device 102A is currently being charged. In some embodiments, the platform application 138 may delay generation of the schedule command 146 and instead create a delay command 150. In some embodiments, the delay command 150 is created in response to determining that the M2M device 102A operates using the depletable power source 121A and/or in response to determining that the depletable power source 121A is below a charge threshold and/or is not being charged. The delay command 150 can instruct the firmware scheduler server 170 to send the firmware update request 178 to the FOTA server 180 when the depletable power source 121A of the M2M device 102A is being charged. Thus, the platform application 138 can monitor future messages from the M2M device 102A, and when the platform application 138 detects that the depletable power source 121A is being charged, then the firmware scheduler server 170 can be given authorization to send the firmware update request 178 to the FOTA server 180. In some embodiments, the delay command 150 can include an application programming interface key that allows the firmware scheduler server 170 to access an application programming interface 186 of the FOTA server 180. For example, the firmware scheduler server 170 can include the application programming interface key and the firmware update package identifier 185 in the firmware update request 178 such that when the firmware update request 178 is received by the FOTA server 180, the FOTA server 180 allows the firmware update request 178 corresponding to the firmware update package identifier 185 to be processed and placed in a queue (not shown) so that the firmware update package 184 can be sent to the M2M device 102A. Moreover, in some embodiments, additional handling instructions (e.g., preferred time to send to M2M devices, particular communication network path to use, etc.) can be processed by the FOTA server 180. For example, the firmware update request 178 can include the route path identifier 162, thereby instructing the FOTA server 180 to use, in an embodiment, the communication path 2 when sending the firmware update package 184 to the M2M device 102A. In some embodiments, the route path identifier 162 is chosen due to the communication path 2 adhering to a wireless standard (e.g., LTE, 5G, etc.), although this may not be case in all embodiments. In some embodiments, information from the state information 192 about the power source 120 can be stored in the registry 140 according to the specific M2M device, such as by appending the state information 192 to the registry 140 and associating the state information 192 with the M2M equipment identifier 142A based on the activity message 190 being sent from the M2M device 102A.

In some embodiments, the platform application 138 can determine whether to send the schedule command 146 based on the frequency that the M2M devices 102 are used. For example, in an embodiment, the platform application 138 can build a usage profile for a particular one of the M2M devices, such as a usage profile 151 for the M2M device 102A and a usage profile 154 for the M2M device 102B. Each of the usage profiles 151, 154 can indicate an amount of usage time that is spent being active and/or a usage frequency. For example, the usage profile 151 can include a usage time 152 and a usage frequency 153 of the M2M device 102A. In some embodiments, the M2M device 102A may be located in an area that is frequently traveled by the user 115, and thus is used more often than the M2M device 102B. In some embodiments, an activity message (e.g., the activity message 190) is sent each time a corresponding one of the M2M devices 102 is used. Therefore, the amount of activity messages sent by one of the M2M devices 102 can be recorded in a corresponding usage frequency of a usage profile. For example, if multiple instances of the activity message 190 are sent by the M2M device 102A, the total number of activity messages sent over a defined period (e.g., over the past month and/or year) can be recorded as the usage frequency 153 (measured as number of instances of use) within the usage profile 151. In some embodiments, the state information 192 includes a time stamp that indicates a time in which the M2M device 102A is in active use and/or the duration of such use. The time information from the state information 192 can be recorded as the usage time 152 within the usage profile 151. Similarly, the usage profile 154 corresponding to the M2M device 102B can include a usage time 155 and a usage frequency 156 (measured in number of instances of use). In some instances, an activity message is sent each time the user 115 provides an input, such as providing the usage command 117 to the M2M device 102A and/or inputting the usage command 119 to the M2M device 102B. The greater number of input instances corresponds with a greater number of activity messages, which in turn can increase the corresponding usage times 152, 155 and usage frequencies 153, 156 tracked within the usage profiles 151, 154, respectively. It is understood that the usage profiles 151, 154 may include values that are unique to the corresponding M2M devices 102A, 102B, and therefore the information included therein may not necessarily be the same or similar. It is understood that the examples discussed are for illustration purposes only, and therefore should not be construed as limiting in any way.

In some embodiments, the platform application 138 can generate a usage threshold 158 that provides a minimum usage frequency 160. The usage threshold 158 can be an indicator of the minimum level of usage that is required by one of the M2M devices 102 in order to trigger the IoT platform 130 to act on behalf of one of the M2M devices 102 in procuring updated firmware, such as the firmware update package 184. The minimum usage frequency 160 includes a value that is determined by the platform application 138. In some embodiments, the minimum usage frequency 160 can be determined by the platform application 138 identifying the number of instances of use for each M2M device associated with a particular user. For example, the platform application 138 may identify the usage frequency 153, 156 from the usage profiles 151, 154, respectively, because the M2M device 102A and the M2M device 102B may correspond with the user 115. In some embodiments, the minimum usage frequency 160 can be calculated by taking the average of all usage frequencies associated with a user's M2M devices, such as the usage frequencies 153, 156 corresponding to the usage profiles 151, 154 for the M2M devices 102A, 102B respectively, which are both associated with the user 115. In some embodiments, the minimum usage frequency 160 can be a percentage of the average of usage frequencies (e.g., if the average usage frequency corresponds with 10 instances of use, the minimum usage frequency 160 could be fifty percent of instances of use, or five instances of use). It is understood that the example provided is for illustration purposes only. In an embodiment, the user 115 provides more instances of input (e.g., the usage commands 117) to the M2M device 102A than to the M2M device 102B, and therefore the value indicated by the usage frequency 153 of the usage profile 151 would exceed the minimum usage frequency 160 of the usage threshold 158. In some embodiments, when the platform application 138 determines that the M2M device 102A exceeds the usage threshold 158, such as by determining that the value indicated by the usage frequency 153 of the usage profile 151 is equal to or greater than the minimum usage frequency 160, then the platform application 138 can generate the schedule command 146 that can be sent to the firmware scheduler server 170.

In some embodiments, one of the M2M devices 102 may not maintain a consistent network connection with the network 124, thereby causing the platform application 138 not to receive as many activity messages compared with other M2M devices that maintain a consistent and/or otherwise constant network connection with the network 124. In some embodiments, one of the usage profiles (e.g., the usage profile 154) can indicate that a corresponding M2M device does not maintain a network connection, or inconsistently maintains a network connection, thereby causing the platform application 138 to determine whether a firmware update should be sent to that M2M device. For example, in some embodiments, the platform application 138 can determine that the usage frequency 156 of the usage profile 154 (which corresponds with the M2M device 102B) falls below, and thus does not exceed, the minimum usage frequency 160 of the usage threshold 158, thereby providing an indication that the M2M device 102B does not maintain a consistent network connection with the network 124. In some embodiments, the M2M device 102B may have the same version of firmware as the M2M device 102A. Specifically, the M2M device 102B can have a firmware identifier 113' that is the same as the firmware identifier 113 of the M2M device 102A, thereby indicating that firmware 112' installed on the M2M device 102B is the same as the firmware 112 installed on the M2M device 102A. However, in some embodiments, even though the firmware 112' of the M2M device 102B may be outdated and eligible for a firmware update (e.g., the firmware update package 184), the platform application 138 may not take action to allow the firmware update package 184 to be provided to the M2M device 102B because the usage frequency 156 corresponding to the M2M device 102B does not exceed the minimum usage frequency 160 of the usage threshold 158. In some embodiments, when the usage frequency 156 for the M2M device 102B does not exceed the usage threshold 158, the platform application 138 can instruct the firmware scheduler server 170 to withhold scheduling the firmware update (e.g., the firmware update package 184) for the M2M device 102B until the M2M device 102 is used more often, which the platform application 138 determines when the usage frequency 156 meets and/or exceeds the usage threshold 158. For example, the platform application 138 can create a withhold command 166 that identifies the M2M device 102B and commands the firmware scheduler server 170 to prohibit the scheduling of a firmware update by instructing the firmware scheduler server 170 not to send the firmware update request 178 to the FOTA server 180 until instructed by the platform application 138. By this, the platform application 138 can help to prevent and/or mitigate potential congestion of the network 124 by disallowing firmware updates to multiple M2M devices 102 unless certain conditions are met (e.g., exceeding the usage threshold 158). It is understood that the examples provided herein are for illustration purposes only, and therefore should not be construed as limiting in any way.

In some embodiments, the firmware scheduler server 170 can be communicatively coupled to the IoT platform 130 via a communication path 3, which can provide a wired and/or wireless communication path. The firmware scheduler server 170 can include a processor 172 and a memory 174 that stores a scheduler application 176. In some embodiments, the scheduler application 176 can communicate with the FOTA server 180 and the IoT platform 130. The scheduler application 176 can receive various commands and instructions from the platform application 138 of the IoT platform 130. For example, the platform application 138 can send one or more instances of the schedule command 146, the delay command 150, and/or the withhold command 166 to the scheduler application 176 of the firmware scheduler server 170. The platform application 138 can provide the schedule command 146 to the scheduler application 176 on behalf of one of the M2M devices 102, such as the M2M device 102A. The scheduler application 176 can execute any of the schedule command 146, the delay command 150, and/or the withhold command 166 and provide actions in response. For example, if the scheduler application 176 receives an instance of the schedule command 146, the scheduler application 176 can determine the equipment identifier (e.g., the equipment identifier 114) and the firmware identifier (e.g., the firmware identifier 113) included therein in order to identify the M2M device (e.g., the M2M device 102A) of which a firmware update is to be scheduled. The scheduler application 176 can create the firmware update request 178 on behalf of the M2M device 102A so that the M2M device 102A can receive an updated firmware (e.g., the firmware update package 184) to update and/or otherwise replace the current instance of the firmware 112 on the M2M device 102A. In some embodiments, the firmware update request 178 can be sent to the FOTA server 180 via a communication path 4. The firmware update request 178 can identify the M2M device 102A that is the target and recipient of the updated firmware, such as the firmware update package 184. The FOTA server 180 can include a firmware data store 182 that stores one or more instances of updated firmware that each corresponds with a unique identifier. For example, the firmware data store 182 can include the firmware update package 184 that corresponds with the firmware update package identifier 185. In some embodiments, the firmware update package 184 is executable such that upon being received by the M2M device 102A, the M2M device 102A can execute the firmware update package 184 so that the updated firmware 116 can be stored and otherwise installed on the M2M device 102A. The updated firmware 116 can overwrite, modify, and/or otherwise replace the previous version of firmware, such as the firmware 112, on the M2M device 102A. The updated firmware 116 can become the current firmware that is installed on the M2M device 102A, and thus future activity messages sent by the network access controller 110 can include the updated firmware identifier 118 corresponding to the updated firmware 116. The updated firmware identifier 118 can be included in the usage profile 151 once the updated firmware 116 is installed and active on the M2M device 102A.

In some embodiments, the IoT platform 130 can influence or otherwise command the FOTA server 180 to provide the firmware update package 184 to the M2M device 102A according to a network communication path type, such as network communication path types 164. The network communication path types 164 can indicate that a wired communication path and/or a wireless communication path should be used to transport the firmware update package 184 to one of the M2M devices 102, such as the M2M device 102A. In some embodiments, a usage profile can store a route path identifier for inclusion with the schedule command 146. For example, in some embodiments, the platform application 138 may determine that the M2M device 102A connects to the network 124 via a wired connection, and therefore stores a route path identifier 161 with the usage profile 151 for the M2M device 102A. In some embodiments, the route path identifier 161 can identify network nodes within the network 124 that correspond with wired transport, such as a fiber optic transport path. In other embodiments, the M2M device 102B may rely on a wireless connection to communicate with the network 124. As such, in some embodiments, the platform application 138 can store a route path identifier 162 with the usage profile 154 for the M2M device 102B, where the route path identifier 162 can, in some embodiments, identify a wireless communication path should be used (e.g., the communication path 2 in some embodiments). In some embodiments, the route path identifiers 161, 162 can indicate a specific communication standard and/or network path type by which the network communication path should comply, such as 4G, WiFi, LTE, or another communications standard. In some embodiments, the route path identifier 161 and/or the route path identifier 162 can be included with the schedule command 146. It is understood that the examples provided are for illustration purposes only, and therefore should not be construed as limiting in any way.

It is understood that zero, one, or more than one instance of the M2M devices 102, the processor 104, the transceiver 106, the memory 108, the network access controller 110, the equipment identifier 114, the firmware 112, the firmware identifier 113, the updated firmware 116, the updated firmware identifier 118, the power source 120, the depletable power source 121A, the depletable power source identifier 122A, the fixed power source 121B, the fixed power source identifier 122B, the user 115, usage command 117, the usage command 119, the communication path 1, the communication path 2, the network 124, the access point 126, the PGW 128, the IoT platform 130, the IoT monitoring service 131, the platform server 132, the processor 134, the memory 136, the platform application 138, the registry 140, the M2M equipment identifiers 142A-142N, the firmware version identifiers 144A-144N, the route path identifiers 161, 162, the network communication path types 164, the usage profile 151, the usage profile 154, the usage threshold 158, the schedule command 146, the delay command 150, the withhold command 166, the target M2M server 194, the communication path 3, the firmware scheduler server 170, the processor 172, the memory 174, the scheduler application 176, the communication path 4, the firmware update request 178, the FOTA server 180, the firmware data store 182, the firmware update package 184, the firmware update package identifier 185, and the application programming interface can be included within the operating environment 100 shown in FIG. 1. As such, the illustrated embodiment should be understood as being illustrative, and should not be construed as being limiting in any way.

Figure 2:
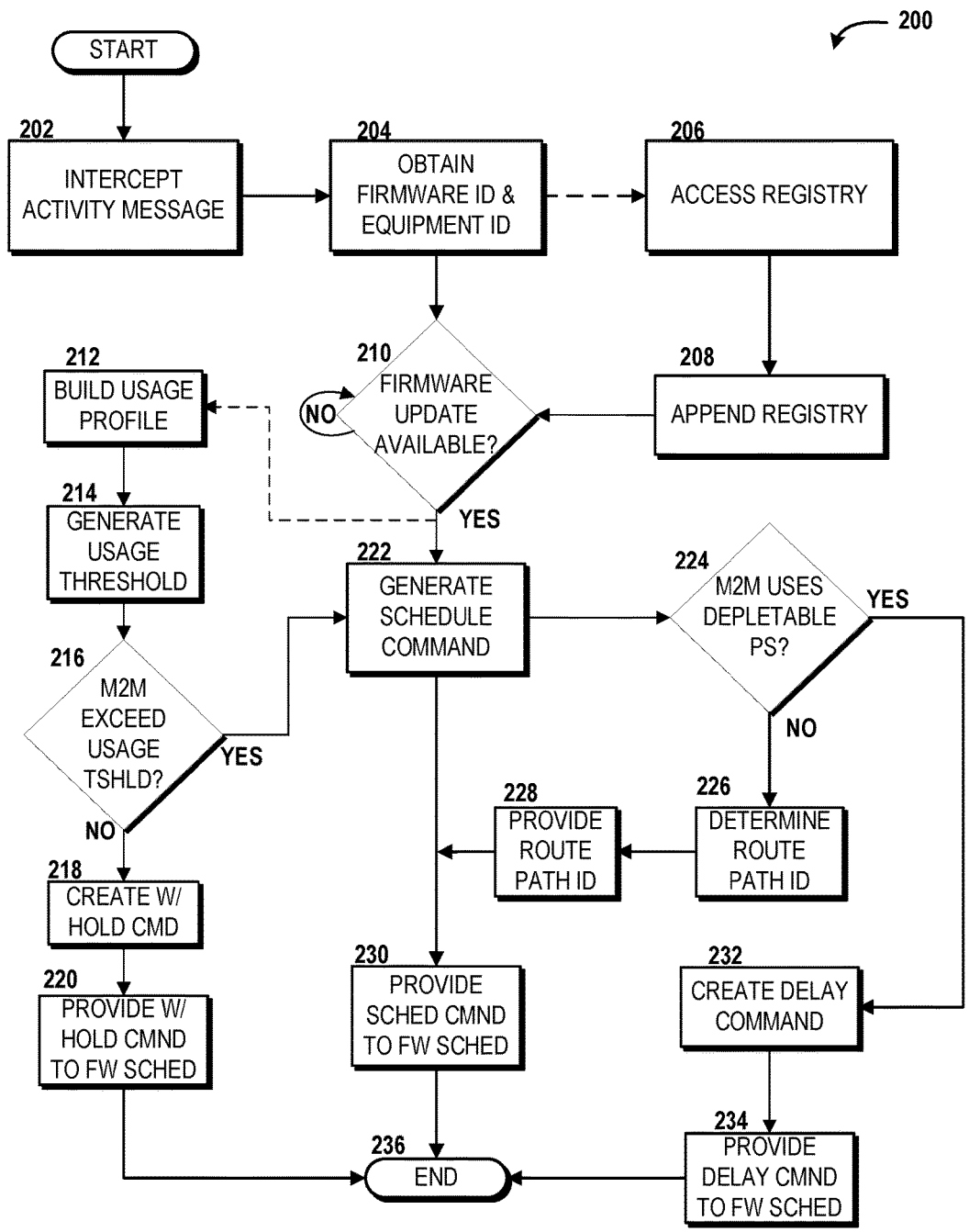
FIG. 2 is a flow diagram showing aspects of a method for handling firmware for machine-to-machine devices, according to an illustrative embodiment of the concepts and technologies described herein.

Turning now to FIG. 2, aspects of a method 200 for user equipment assessment for network connection provisioning will be described in detail, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the IoT platform 130, the platform server 132, the firmware scheduler server 170, the FOTA server 180, and/or the M2M devices 102, to perform one or more operations and/or causing the processor to direct other components of the computing system or device to perform one or more of the operations.

For purposes of illustrating and describing the concepts of the present disclosure, the methods disclosed herein are described as being performed by the platform server 132 via execution of one or more software modules such as, for example, the platform application 138 that configure one or more processors. It should be understood that additional and/or alternative devices and/or network nodes can, in some embodiments, provide the functionality described herein via execution of one or more modules, applications, and/or other software including, but not limited to, the M2M device 102A executing the network access controller 110, and/or the firmware scheduler server 170 executing the scheduler application 176. Thus, the illustrated embodiments are illustrative, and should not be viewed as being limiting in any way.

The method 200 begins at operation 202, where the platform application 138 can intercept the activity message 190 sent by the M2M device 102A via the network 124. The platform application 138 can be executing on the platform server 132 that supports the IoT platform 130. The activity message 190 can be intercepted before being relayed or otherwise provided to the target M2M server 194. The activity message 190 can include the state information 192 and, in some embodiments, the activity message 190 can be configured so as not to include a request to update the firmware 112 that resides on the M2M device 102A. The method can proceed from operation 202 to operation 204, where the platform application 138 can obtain the equipment identifier 114 and the firmware identifier 113 of the firmware 112 associated with the M2M device 102A from the activity message 190.

In some embodiments, the method 200 can proceed from operation 204 to operation 206, where the platform application 138 can access the registry 140 based on the equipment identifier 114 of the M2M device 102A. From operation 206, the method 200 can proceed to operation 208, where the platform application 138 can append the firmware identifier 113 to the registry 140. The firmware identifier 113 can be appended to the registry 140 in order to denote that the firmware 112 is currently installed and resides on the M2M device 102A.

The method 200 can proceed from either operation 204 or operation 208 to operation 210, where the platform application 138 can determine whether a firmware update package, such as the firmware update package 184, is available for the M2M device 102A. For example, the platform application 138 can identify whether the firmware update package identifier 185 is present within the registry 140 for the M2M equipment identifier 142A that is associated with the M2M device 102A, thereby indicating that the firmware update package 184 is available from the FOTA server 180 for installation on the M2M device 102A. In some embodiments, if the firmware update package identifier 185 is not stored in the registry 140, then the method 200 can proceed along the NO path, where the platform application 138 can continue to check the registry 140 at operation 210 until the firmware update package identifier 185 is found. In an embodiment in which the firmware update package 184 is available for the M2M device 102A, the method 200 can proceed along the YES path to the operation 222, where the platform application 138 can generate the schedule command 146. The schedule command 146 can instruct the firmware scheduler server 170 to send the firmware update request 178 to the FOTA server 180 in order to request the firmware update package 184 on behalf of the M2M device 102A.

In some embodiments, the method 200 can proceed along the YES path to operation 212 before proceeding to operation 222. At operation 212, the platform application 138 can build the usage profile 151 that indicates the usage time 152 and the usage frequency 153 corresponding to the M2M device 102A. From operation 212, the method 200 can proceed to operation 214, where the platform application 138 can generate the usage threshold 158. The usage threshold 158 can be generated so as to indicate the minimum amount of usage by the M2M device 102A (e.g., via the minimum usage frequency 160) that will trigger further operations to be performed with regard to the scheduling of a firmware update on behalf of the M2M device 102A. From operation 214, the method 200 can proceed to operation 216, where the platform application 138 can determine whether one or more of the M2M devices 102 exceeds the usage threshold 158. For example, the platform application 138 can identify the usage frequency 153 associated with the usage profile 151 for the M2M device 102A, and then compare the usage frequency 153 with the usage threshold 158 to determine whether the usage threshold 158 has been met and/or exceeded. If the usage frequency 153 meets and/or exceeds the usage threshold 158, then the method 200 can proceed from operation 216 to operation 222. If the usage frequency 153 for the M2M device 102A does not meet and/or exceed the usage threshold 158, then the method 200 can proceed along the NO path to operation 218. For clarity, a discussion of operations along the NO path will be provided first, followed by a discussion along the YES path to operation 222.

At operation 218, the platform application 138 can create the withhold command 166 corresponding to the M2M device 102A. The withhold command 166 can identify the particular M2M device that did not exceed the usage threshold 158, such as by including the equipment identifier 114 and/or M2M equipment identifier 142A corresponding to the M2M device 102A. The withhold command 166 can instruct the firmware scheduler server 170 to withhold scheduling of the firmware update for the M2M device 102A until the usage threshold 158 is exceeded. The firmware scheduler server 170 can determine that the usage threshold 158 is exceeded when the platform application 138 sends a message to schedule a firmware update, such as via the schedule command 146. From operation 218, the method 200 can proceed to operation 220, where the platform application 138 can provide the withhold command 166 to the firmware scheduler server 170 so as to instruct the firmware scheduler server 170 to withhold scheduling of a firmware update for the M2M device 102A until the usage threshold 158 is exceeded. From operation 220, the method 200 can proceed to operation 236. At operation 236, the method 200 can end.

Returning to operation 222, in some embodiments, the method 200 can proceed from operation 222 to operation 230, where the platform application 138 can provide the schedule command 146 to the firmware scheduler server 170. From operation 230, the method 200 can proceed to operation 236, where the method 200 can end. Returning to operation 222, in some embodiments, the method 200 can proceed from operation 222 to operation 224, where the platform application 138 can determine whether the M2M device 102A is using a depletable power source (e.g., the depletable power source 121A) or a fixed power source (e.g., the fixed power source 121B). In some embodiments, at least one of the depletable power source identifier 122A or the fixed power source identifier 122B can be included with the state information 192 that is provided in the activity message 190. If the depletable power source identifier 122A is included in the activity message 190, then the platform application 138 can determine that the M2M device 102A is using a depletable power source. If the fixed power source identifier 122B is included in the activity message 190, then the platform application 138 can determine that the M2M device 102A operates using a fixed power source. If the depletable power source identifier 122A is detected by the platform application 138, then the method 200 can proceed along the YES path to operation 232. If the depletable power source identifier 122A is not detected by the platform application 138, then the method 200 can proceed along the NO path to operation 226. For clarity, a discussion along the YES path to operation 232 will be provided first, followed by a discussion along the NO path to operation 226.

At operation 232, the platform application 138 can create the delay command 150 that instructs the firmware scheduler server 170 to delay sending the firmware update request 178 until the depletable power source 121A of the M2M device 102A is being charged (i.e., recharging). The firmware scheduler server 170 can detect that the depletable power source 121A is being charged when the platform application 138 sends an indication message (not shown) that the charging of the depletable power source 121A is occurring. The platform application 138 can determine that charging of the depletable power source 121A is occurring based on the state information (e.g., the state information 192) that can indicate the current charging status of the power source 120. From operation 232, the method 200 can proceed to operation 234, where the platform application 138 can provide the delay command 150 to the firmware scheduler server 170, such as specifically addressed to the scheduler application 176 that handles the creation of the firmware update requests, such as the firmware update request 178. From operation 234, the method 200 can proceed to operation 236, where the method 200 can end.

Returning to operation 224, the method 200 can proceed along the NO path to operation 226, where the platform application 138 can determine a route path identifier (e.g., the route path identifier 161 and/or the route path identifier 162) that indicates a network communication path type that should be used to route the firmware update package 184 to the M2M device 102A. From operation 226, the method 200 can proceed to operation 228, where the platform application 138 can provide the route path identifier (e.g., the route path identifier 161 and/or the route path identifier 162) to the firmware scheduler server 170. The method 200 can proceed from operation 228 to operation 230, where one or more of the route path identifiers 161, 162 can be provided to the firmware scheduler server 170 with the schedule command 146, such as discussed in operation 230. As discussed above, the method 200 can proceed from operation 230 to operation 236, where the method 200 can end. It is understood that the examples provided herein are for illustration purposes only, and therefore should not be construed as limiting in any way.

Figure 3:
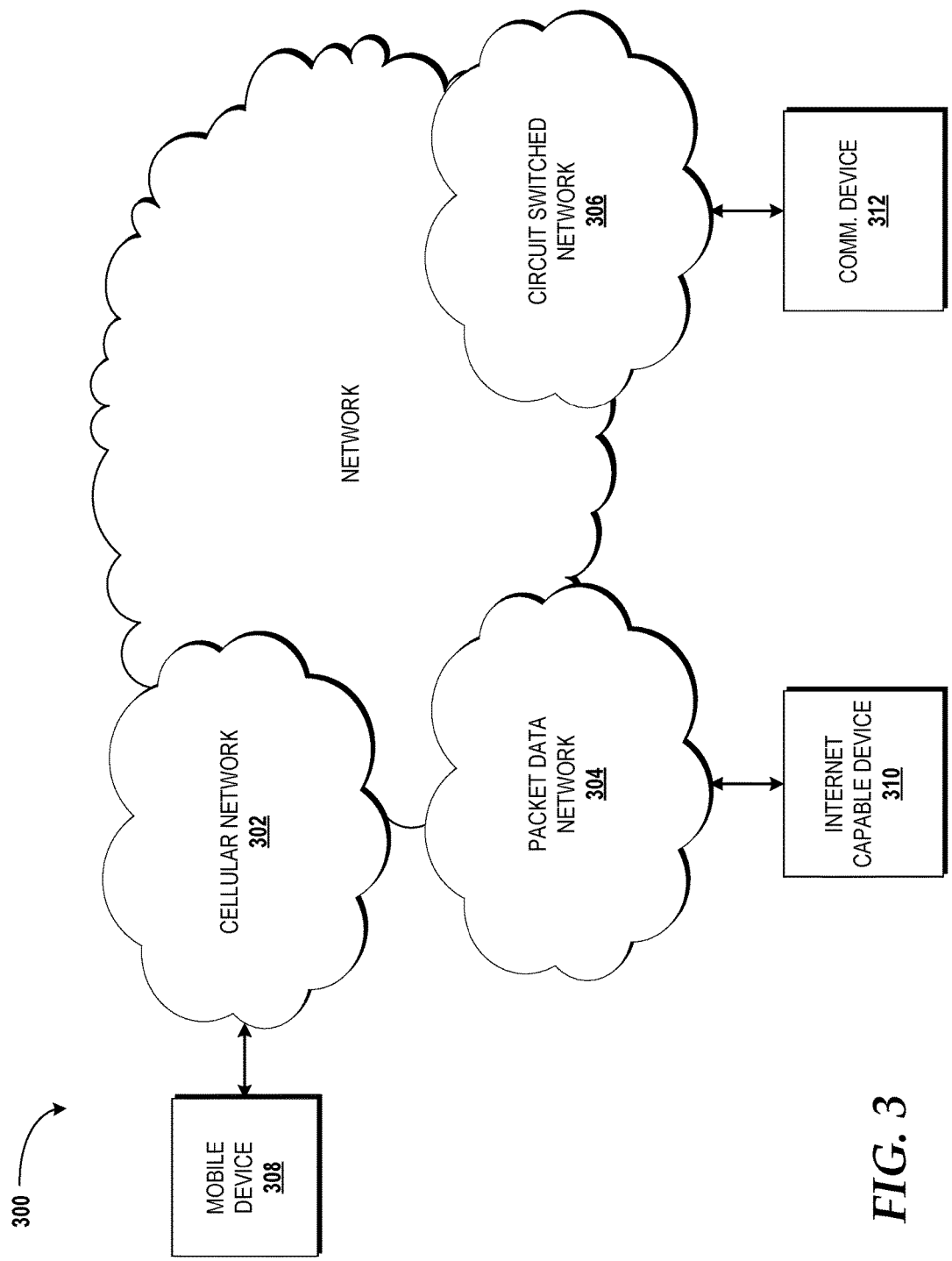
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 300 can be an embodiment of the network 124. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

The mobile communications device 308, such as, for example, a cellular telephone, a mobile terminal, a PDA, a laptop computer, a handheld computer, and combinations thereof, can be operatively connected to the cellular network 302. In some embodiments, one or more of the M2M devices 102 can be configured as the mobile communications device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G and 5G mobile communications standards such as LTE, or the like, as well as evolved and future mobile standards, including but not limited to LTE-Advanced, LTE-Advanced Pro and 5G.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the at least some of the network 124 can be configured as a packet data network, such as the packet data network 304. The circuit switched network 306 includes various hardware and software for providing circuit switched communications. The circuit switched network 306 may include, or may be, what is often referred to as a POTS. In some embodiments, the at least some of the network 124 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, an M2M device (e.g., the M2M devices 102) or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 124 can be performed by the cellular network 302, the packet data network 304, and/or the circuit switched network 306, alone or in combination with other networks, network elements, and the like, according at least to aspects of the features and operations discussed herein.

Figure 4:
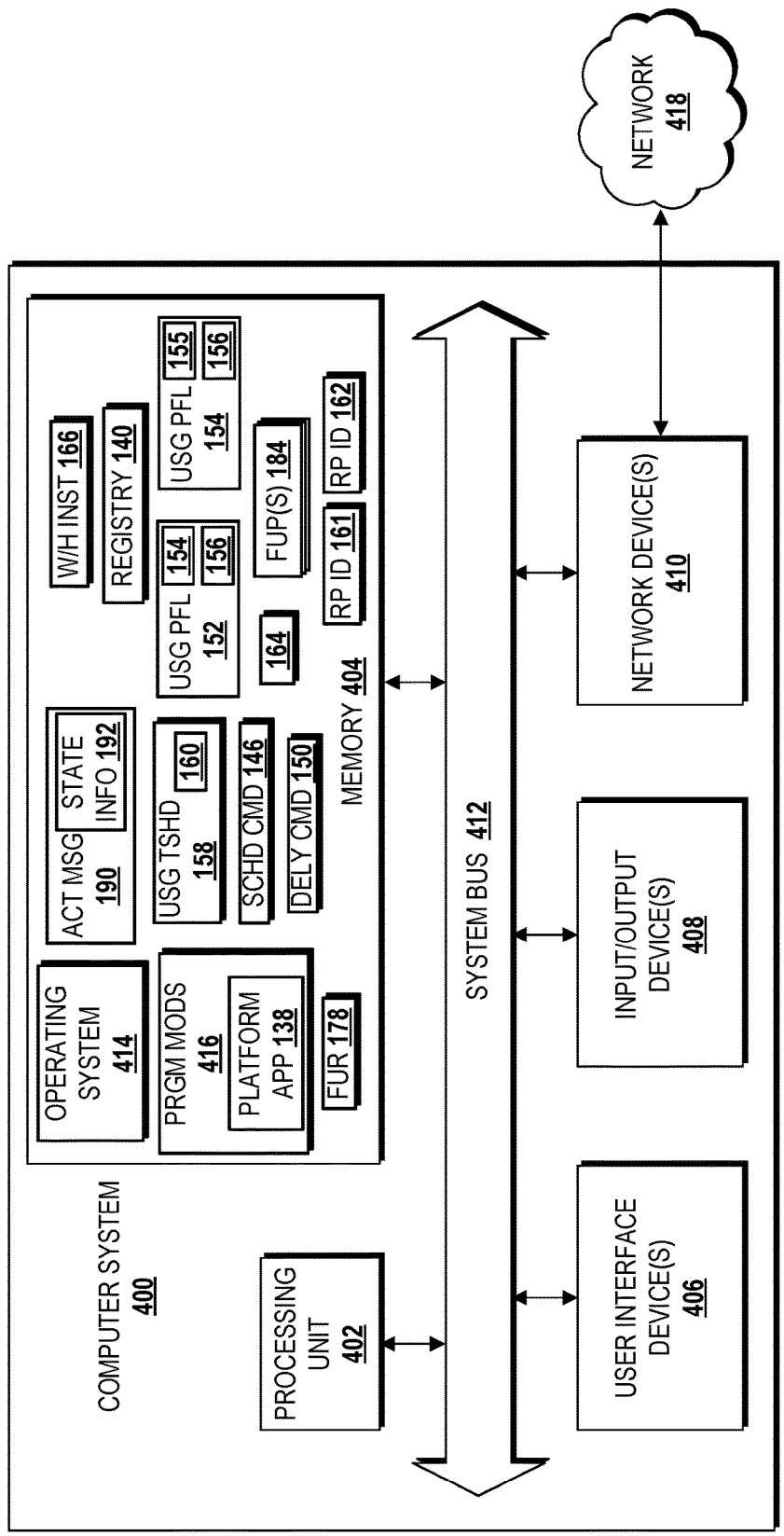
FIG. 4 is a block diagram illustrating an example computer system configured to provide, implement, and execute operations associated with handling firmware for machine-to-machine devices, according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the IoT platform 130, the platform server 132, the target M2M server 194, the firmware scheduler server 170, the FOTA server 180, the access point 126, and/or the PGW 128 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the platform application 138 and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. In some embodiments, the memory 404 also can be configured to store the usage threshold 158, the minimum usage frequency 160, the schedule command 146, the delay command 150, the withhold command 166, the registry 140, the usage profile 151, the usage profile 154, the firmware update request 178, the activity message 190, the state information 192, the firmware update package 184, the network communication path type 164, the route path identifier 161, and the route path identifier 162, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 124). Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
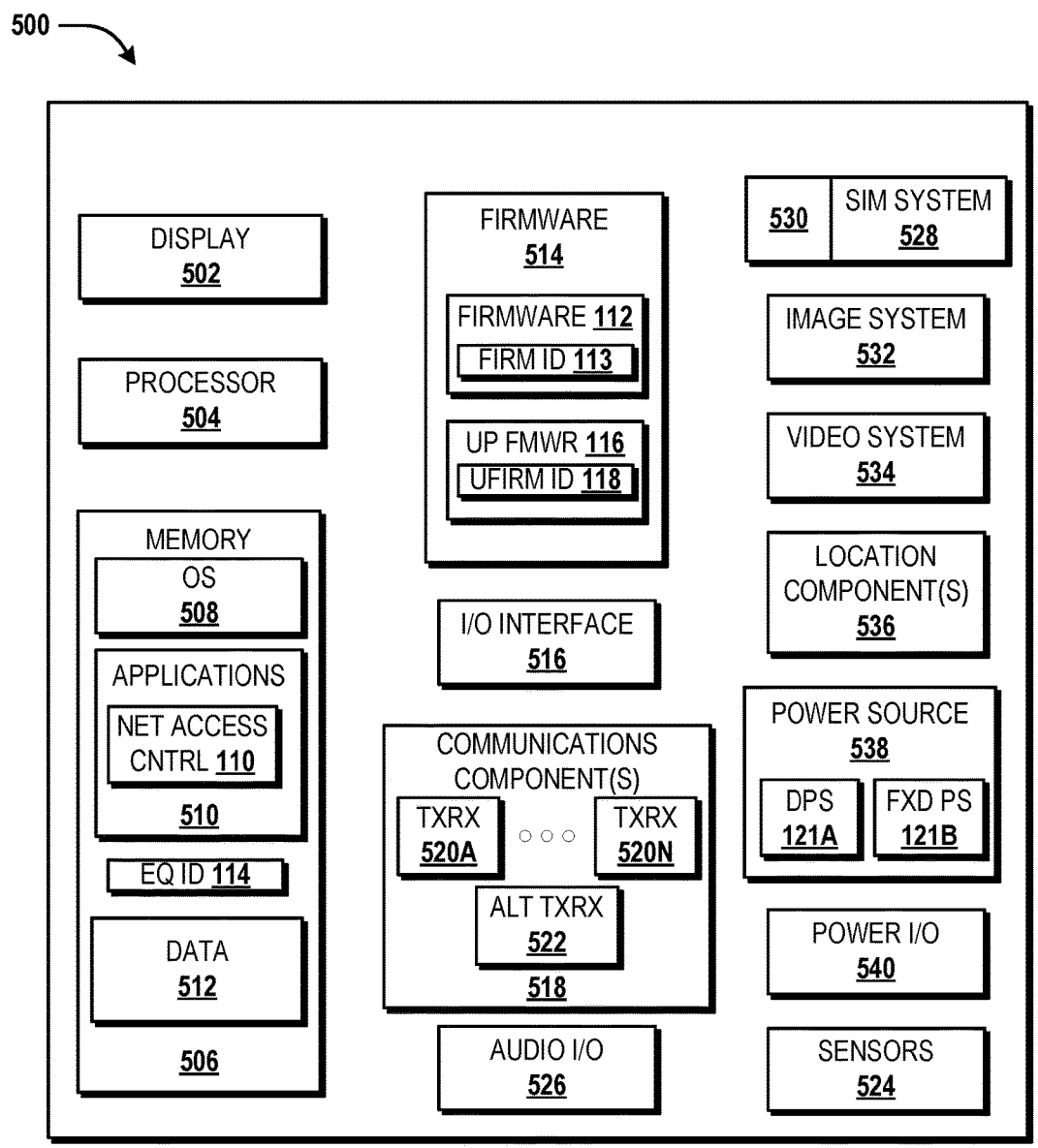
FIG. 5 is a block diagram illustrating an example user equipment capable of being configured as a machine-to-machine device for implementing aspects of the handling of firmware according to embodiments of the concepts and technologies described herein.

Turning now to FIG. 5, an illustrative machine-to-machine (M2M) device 500 and components thereof will be described. In some embodiments, one or more of the M2M devices 102 (shown in FIG. 1) can be configured like the M2M device 500. It is understood that the M2M device 500 can be configured to take the form of a mobile communications device, a tablet, a wearable computing device, a heads-up display computer system, a vehicle computing system, an attachable computing device, a camera, an appliance (e.g., a refrigerator, an oven, a microwave, etc.), a television, a handheld device, an IoT dongle, a combination thereof, or other M2M devices that can implement network communications. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the M2M device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The M2M device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the M2M device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the M2M device 500. The data 512 can include, for example, one or more identifiers, and/or other applications or program modules. In some embodiments, the data 512 can include one or more of the equipment identifier 114, the firmware identifier 113, the updated firmware identifier 118, and/or other data sent among and/or between the M2M devices 102 and the IoT platform 130. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the network access controller 110. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof. In some embodiments, the firmware 514 can include one or more of the firmware 112 and/or the updated firmware 116.

The M2M device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the M2M device 500 can be configured to synchronize with another device to transfer content to and/or from the M2M device 500. In some embodiments, the M2M device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the M2M device 500 and a network device or local device.

The M2M device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The M2M device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the M2M device 500 may be provided by an audio I/O component 526. The audio I/O component 526 of the M2M device 500 can include one or more speakers for the output of audio signals, one or more microphones for the collection and/or input of audio signals, and/or other audio input and/or output devices.

The illustrated M2M device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the M2M device 500 are contemplated, it should be understood that these embodiments are illustrative, and should not be construed as being limiting in any way.

The M2M device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The M2M device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The M2M device 500 also can include one or more location components 536. The location components 536 can be configured to send and/or receive signals to determine a geographic location of the M2M device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the M2M device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the M2M device 500. Using the location component 536, the M2M device 500 can generate and/or receive data to identify its geographic location, or to transmit data used by other devices to determine the location of the M2M device 500. The location component 536 may include multiple components for determining the location and/or orientation of the M2M device 500.

The illustrated M2M device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. In some embodiments, the power source 538 can include one or more of the depletable power source 121A and/or the fixed power source 121B. Because the M2M device 500 can include additional and/or alternative components, the above embodiment should be understood as being illustrative of one possible operating environment for various embodiments of the concepts and technologies described herein. The described embodiment of the M2M device 500 is illustrative, and should not be construed as being limiting in any way.

Based on the foregoing, it should be appreciated that concepts and technologies directed to handling firmware for machine to machine devices via a service provider network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, in response to execution by the processor, cause the processor to perform operations comprising:
intercepting, via a service provider network, an activity message that is directed to a target machine-to-machine server and is sent from a machine-to-machine device, wherein the activity message includes a firmware version identifier but does not request a firmware update,
obtaining the firmware version identifier and an equipment identifier from the activity message,
in response to determining that a firmware update package is available for the machine-to-machine device based on the activity message, generating a schedule command that instructs a firmware scheduler to send a firmware update request to a firmware-over-the-air server,
providing the schedule command to the firmware scheduler on behalf of the machine-to-machine device, and
providing, via the service provider network, the activity message to be routed to the target machine-to-machine server.

2. The system of claim 1, wherein the operations further comprise:
accessing a registry based on the equipment identifier of the machine-to-machine device, and
appending the registry to include the firmware version identifier corresponding to a firmware package resident on the machine-to-machine device.

3. The system of claim 1, wherein the operations further comprise:
determining a route path identifier that indicates a network communication path type that should be used to route the firmware update package to the machine-to-machine device, and
providing the route path identifier with the schedule command to the firmware scheduler.

4. The system of claim 1, wherein the operations further comprise:
determining whether the machine-to-machine device operates using a depletable power source or fixed power source, and
in response to determining that the machine-to-machine device operates using the depletable power source, creating a delay command that instructs the firmware scheduler to send the firmware update request on behalf of the machine-to-machine device when the depletable power source of the machine-to-machine device is being charged.

5. The system of claim 1, wherein the operations further comprise:
building a usage profile that indicates a usage time and a usage frequency by the machine-to-machine device, and
generating a usage threshold that provides a minimum usage frequency.

6. The system of claim 5, wherein the operations further comprise determining that the machine-to-machine device exceeds the usage threshold, wherein generating the schedule command is in response to the machine-to-machine device exceeding the usage threshold.

7. The system of claim 5, wherein the operations further comprise:
determining that the machine-to-machine device does not exceed the usage threshold, and
instructing the firmware scheduler to withhold scheduling a firmware update for the machine-to-machine device until the usage threshold is exceeded.

8. A method comprising:
intercepting, by a computer system via a service provider network, an activity message that is directed to a target machine-to-machine server and is sent from a machine-to-machine device via the service provider network, wherein the activity message includes a firmware version identifier but does not request a firmware update;
obtaining, by the computer system, the firmware version identifier and an equipment identifier from the activity message;
in response to determining that a firmware update package is available for the machine-to-machine device based on the activity message, generating, by the computer system, a schedule command that instructs a firmware scheduler to send a firmware update request to a firmware-over-the-air server;

providing, by the computer system, the schedule command to the firmware scheduler on behalf of the machine-to-machine device; and providing, by the computer system via the service provider network, the activity message to be routed to the target machine-to-machine server.

9. The method of claim 8, further comprising:

accessing by the computer system, a registry based on the equipment identifier of the machine-to-machine device; and appending by the computer system, the registry to include the firmware version identifier corresponding to a firmware package resident on the machine-to-machine device.

10. The method of claim 8, further comprising:

determining, by the computer system, a route path identifier that indicates a network communication path type that should be used to route the firmware update package to the machine-to-machine device; and providing, by the computer system, the route path identifier with the schedule command to the firmware scheduler.

11. The method of claim 8, further comprising:

determining whether the machine-to-machine device operates using a depletable power source or fixed power source; and in response to determining that the machine-to-machine device operates using the depletable power source, creating a delay command that instructs the firmware scheduler to send the firmware update request on behalf of the machine-to-machine device when the depletable power source of the machine-to-machine device is being charged.

12. The method of claim 8, further comprising:

building, by the computer system, a usage profile that indicates a usage time and a usage frequency by the machine-to-machine device; and generating, by the computer system, a usage threshold that provides a minimum usage frequency.

13. The method of claim 12, further comprising determining, by the computer system, that the machine-to-machine device exceeds the usage threshold, wherein generating the schedule command is in response to the machine-to-machine device exceeding the usage threshold.

14. The method of claim 12, further comprising:

determining that the machine-to-machine device does not exceed the usage threshold; and instructing the firmware scheduler to withhold scheduling a firmware update for the machine-to-machine device until the usage threshold is exceeded.

15. A computer storage medium having computer-executable instructions stored thereon that, in response to execution by a processor of a system, cause the processor to perform operations comprising:

intercepting, via a service provider network, an activity message that is directed to a target machine-to-machine server and is sent from a machine-to-machine device, wherein the activity message includes a firmware version identifier but does not request a firmware update, obtaining the firmware version identifier and an equipment identifier from the activity message, in response to determining that a firmware update package is available for the machine-to-machine device based on the activity message, generating a schedule command that instructs a firmware scheduler to send a firmware update request to a firmware-over-the-air server, providing the schedule command to the firmware scheduler on behalf of the machine-to-machine device, and providing, via the service provider network, the activity message to be routed to the target machine-to-machine server.

16. The computer storage medium of claim 15, wherein the activity message includes state information that does not request a firmware update.

17. The computer storage medium of claim 15, wherein the operations further comprise:

accessing a registry based on the equipment identifier of the machine-to-machine device, and appending the registry to include the firmware version identifier corresponding to a firmware package resident on the machine-to-machine device.

18. The computer storage medium of claim 15, wherein the operations further comprise:

determining a route path identifier that indicates a network communication path type that should be used to route the firmware update package to the machine-to-machine device, and providing the route path identifier with the schedule command to the firmware scheduler.

19. The computer storage medium of claim 15, wherein the operations further comprise:

determining whether the machine-to-machine device operates using a depletable power source or fixed power source, and in response to determining that the machine-to-machine device operates using the depletable power source, creating a delay command that instructs the firmware scheduler to send the firmware update request on behalf of the machine-to-machine device when the depletable power source of the machine-to-machine device is being charged.

20. The computer storage medium of claim 15, wherein the operations further comprise:

building a usage profile that indicates a usage time and a usage frequency by the machine-to-machine device, generating a usage threshold that provides a minimum usage frequency, and determining that the machine-to-machine device exceeds the usage threshold, wherein generating the schedule command is in response to the machine-to-machine device exceeding the usage threshold.

* * * * *